(12) United States Patent
Yuzawa

(10) Patent No.: US 9,052,570 B2
(45) Date of Patent: Jun. 9, 2015

(54) LIGHT-ADJUSTING UNIT AND PROJECTOR

(71) Applicant: Seiko Epson Corporation, Tokyo (JP)

(72) Inventor: Fumio Yuzawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 249 days.

(21) Appl. No.: 13/754,067

(22) Filed: Jan. 30, 2013

(65) Prior Publication Data

US 2013/0201409 A1 Aug. 8, 2013

(30) Foreign Application Priority Data

Feb. 7, 2012 (JP) ................. 2012-023835

(51) Int. Cl.
| | |
|---|---|
| G03B 21/14 | (2006.01) |
| G03B 9/02 | (2006.01) |
| G03B 9/08 | (2006.01) |
| G03B 9/12 | (2006.01) |
| G03B 9/46 | (2006.01) |
| F21V 17/02 | (2006.01) |
| F21V 11/18 | (2006.01) |
| H04N 5/64 | (2006.01) |
| H04N 9/31 | (2006.01) |
| G03B 21/20 | (2006.01) |

(52) U.S. Cl.
CPC ............. *G03B 9/12* (2013.01); *F21V 11/183* (2013.01); *H04N 5/64* (2013.01); *G03B 21/14* (2013.01); *G03B 9/02* (2013.01); *G03B 9/08* (2013.01); *G03B 9/46* (2013.01); *F21V 17/02* (2013.01); *H04N 9/3155* (2013.01); *G03B 21/2053* (2013.01)

(58) Field of Classification Search
CPC ............. G03B 21/14; G03B 9/02; G03B 9/08; G03B 9/12; G03B 9/46; F21V 17/02
USPC .......... 353/97, 75, 88; 359/236, 739; 369/118; 362/319, 325
See application file for complete search history.

(56) References Cited

U.S. PATENT DOCUMENTS

| | | | | |
|---|---|---|---|---|
| 2,227,592 | A * | 1/1941 | La Vezzi ....................... 352/208 |
| 2006/0050249 | A1* | 3/2006 | Hashimoto et al. ............ 353/97 |
| 2009/0174869 | A1* | 7/2009 | Inui et al. ...................... 353/91 |
| 2009/0225389 | A1* | 9/2009 | Nakano ......................... 359/236 |
| 2009/0251757 | A1* | 10/2009 | Yamamura et al. ........... 359/230 |
| 2011/0222026 | A1 | 9/2011 | Usuda et al. | |
| 2011/0310358 | A1* | 12/2011 | Wakabayashi et al. ........ 353/38 |

FOREIGN PATENT DOCUMENTS

| | | |
|---|---|---|
| CN | 102171609 A | 8/2011 |
| JP | 2010-175879 A | 8/2010 |

* cited by examiner

*Primary Examiner* — William C Dowling
*Assistant Examiner* — Magda Cruz
(74) *Attorney, Agent, or Firm* — ALG Intellectual Property, LLC

(57) ABSTRACT

A light-adjusting unit includes: a pair of light-shielding plates arranged about an illuminating optical axis of an incoming light flux and configured to block the light flux in response to the amount of rotation; a pair of rotation transmitting gears configured to hold and rotate the pair of light-shielding plates respectively; a pair of supporting shafts configured to rotatably support the pair of rotation transmitting gears respectively; a supporting substrate on which the pair of supporting shafts are provided; and a pair of urging members configured to press and urge the pair of rotation transmitting gears respectively against the supporting substrate.

18 Claims, 8 Drawing Sheets

LIGHT-ADJUSTING UNIT AND PROJECTOR

BACKGROUND

1. Technical Field

The present invention relates to a light-adjusting unit and a projector.

2. Related Art

In the related art, a projector configured to modulate a light flux emitted from a light source unit by a light-modulating unit according to an image signal and project the modulated light flux on a screen or the like as image light is known. Examples of such a projector include those having a light-adjusting unit configured to adjust the light amount of the light flux to be caused to enter the light-modulating unit corresponding to the brightness of an image to be projected. The projectors having such a light-adjusting unit provide high dynamic contrast.

A light-adjusting unit disclosed in JP-A-2010-175679 includes a dimming unit configured to dim a light flux emitted from a light source, a second gear and a third gear having the dimming unit mounted thereon and configured to rotate for changing the position of the diming unit, a base portion having a supporting shaft configured to rotatably support the second gear and the third gear and configured to sandwich the second gear and the third gear respectively with an optical component housing in the direction substantially orthogonal to an axial center of the supporting shaft. In this configuration, the supporting shaft is allowed to be projected from a rotating portion, the rotating portion is prevented from coming apart from the supporting shaft without arranging a guard ring or the like, and a stable rotation is achieved by changing the position of the dimming unit adequately.

In the light-adjusting unit disclosed in JP-A-2010-175679, the second gear and the third gear rotate by being supported by a substantially column-shaped supporting shaft fixed to the base portion. However, the second gear and the third gear supported by the supporting shaft in this manner have a problem of being subject to inclination with respect to the supporting shaft after a long time use, and hence being liable to rattle during the rotation thereof. Also, the light-adjusting unit has a problem that the position of the dimming unit (light-shielding plate) is shifted by the rattling of the rotation of the gears and hence the light shielding for shielding the light to a predetermined passing light amount is not achieved, so that light-adjusting control cannot be performed with high degree of accuracy. Accordingly, the projector provided with the light-adjusting unit has a problem that high dynamic contrast which is maintained for a long time is not obtained.

Therefore, a light-adjusting unit capable of preventing rotation from rattling even after the long time of use and a projector having such a light-adjusting unit have been demanded.

SUMMARY

An advantage of some aspects of the invention is to solve at least a part of the problems described above, and the invention can be implemented as the following forms or application examples.

According to an aspect of the invention, an urging member presses and urges a rotation transmitting gear holding a light-shielding plate against a supporting substrate. Accordingly, a light-adjusting unit is capable of preventing rattling of rotation of the rotation transmitting gear rotating by being supported by a supporting shaft, and preventing rattling stably for a long time of use as well. Therefore, a pair of light-shielding plates rotating by being directly or indirectly held by the rotation transmitting gears are allowed to maintain the stable rotation for a long time, and to adjust a passing light amount adequately.

When the urging member is formed of a coil spring, the urging member can follow the rattling generated due to vibrations or the like caused by the rotation of the rotation transmitting gears, so that the rotation transmitting gears can be stably pressed against the supporting substrate.

The urging member is capable of moving the rotation transmitting gears to bring an inner surface of a hole portion of the rotation transmitting gears into abutment with an outer surface of the supporting shaft by pressing a pressing portion provided eccentrically with respect to a center axis of the hole portion. Accordingly, the light-adjusting unit may prevent the inclination of the rotation transmitting gears with respect to the supporting shaft because a gap between the supporting shaft and the hole portion may be eliminated. Therefore, the light-adjusting unit may further prevent the rattling of the rotation of the rotation transmitting gears.

In a state in which the light-shielding plates are closed (a state in which the light mount to be passed is minimized), a pair of the rotation transmitting gears are urged in the direction in which a gap at end portions of the pair of shielding plates facing each other on the optical axis side is reduced, so that the center distance between the pair of rotation transmitting gears in the state in which the light-shielding plates are closed may be stabilized. Accordingly, by setting the gap between the end portions of the light-shielding plates facing each other on the optical axis side minimized in the state in which the light-shielding plates are closed, the light-adjusting unit may maintain a state in which the gap in the state in which the light-shielding plates are closed is minimized even though the light-shielding plates are rotated for a long time. Therefore, the light-adjusting unit is capable of performing the light-adjusting control of the light-shielding plates with high degree of accuracy.

The rotation transmitting gear is capable of being urged by the urging member and is capable of sliding smoothly on a surface of a sheet member. The light-adjusting unit is capable of inhibiting a noise caused by the rotation of the rotation transmitting gear by a smoothly sliding motion of the rotation transmitting gear, so that silencing is achieved.

When the light-adjusting control of the light amount to be passed is achieved with high degree of accuracy with the provision of the light-adjusting unit configured to prevent the rattling of the rotation of the rotation transmitting gear, high dynamic contrast with respect to an image to be projected is achieved and, in addition, the high dynamic contrast is maintained for a long time.

BRIEF DESCRIPTION OF THE DRAWINGS

The invention will be described with reference to the accompanying drawings, wherein like numbers reference like elements.

Figure 1:
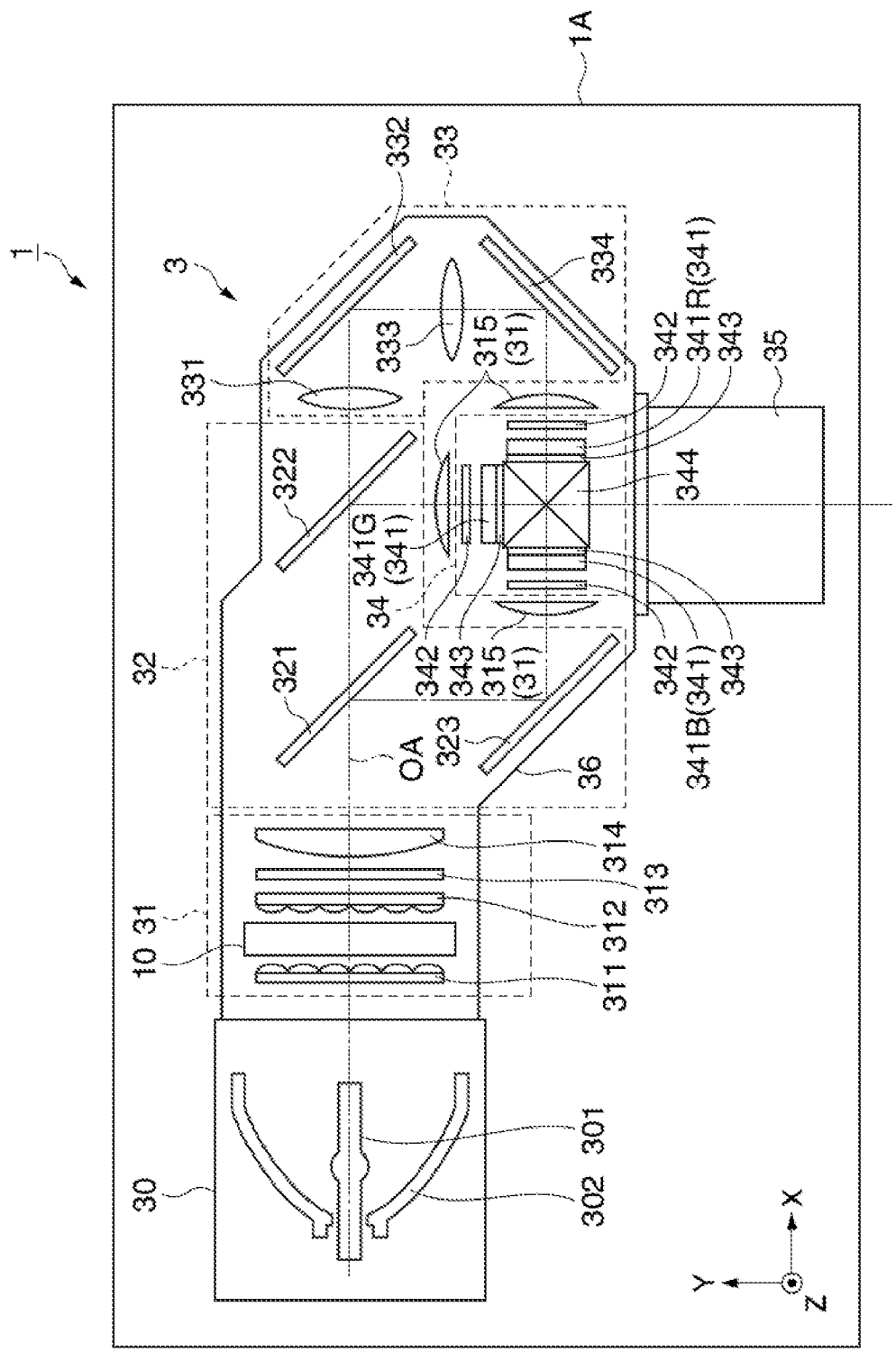
FIG. 1 is a schematic drawing illustrating a schematic configuration of a projector according to a first embodiment.

DESCRIPTION OF EXEMPLARY
EMBODIMENTS

Referring now to the drawings, embodiments will be described.

First Embodiment

FIG. 1 is a schematic drawing illustrating a schematic configuration of a projector 1 according to a first embodiment. Referring to FIG. 1, the schematic configuration of the projector 1 according to the first embodiment will be described.

The drawings from FIG. 1 onward are illustrated in an XYZ orthogonal coordinate system for the convenience of description. In the XYZ orthogonal coordinate system, the direction of travel of a light flux along a lighting optical axis OA is determined as X(+X) direction, and the direction orthogonal to the X direction opposite from the direction in which image light goes out from a projecting lens 35 is defined as Y(+Y) direction. The direction orthogonal to the X direction and the Y direction and, simultaneously, an upward direction (the direction against the direction of gravitational force) in a posture of being placed on a table is defined as Z(+Z) direction.

The projector 1 of the first embodiment is an electronic equipment configured to modulate a light flux emitted from a light source according to an image signal and project the modulated light flux on a projecting surface such as a screen in an enlarged scale. The projector 1 includes an optical unit 3, a control unit (not illustrated), a power source unit (not illustrated) configured to supply power to the control unit or the like, and a cooling unit (not illustrated) configured to cool the interior of the projector 1, and the respective units are housed in the interior of an outer housing 1A as illustrated in FIG. 1.

The optical unit 3 is a unit configured to optically process a light flux emitted from a light source unit 30, and form and project image light according to an image signal on the basis of a control by the control unit. The optical unit 3 includes the light source unit 30, an illuminating optical unit 31, a color separating optical unit 32, a relay optical unit 33, an electro-optic unit 34, and an optical component housing 36 configured to house the optical units 30 to 34 in the interior thereof and configured to fixedly support the projecting lens 35 at a predetermined position.

The light source unit 30 includes a light source 301 and a reflector 302. The light source unit 30 aligns the direction of emission of a light flux emitted from the light source 301 by the reflector 302 to collimate the light flux with respect to the lighting optical axis OA and emits the collimated light to the illuminating optical unit 31. The lighting optical axis OA is a center axis of the light flux emitted from the light source unit 30 toward an illuminated area. The light source unit 30 of the first embodiment employs an extra high-pressure mercury lamp.

The illuminating optical unit 31 includes a first lens array 311, a second lens array 312, a polarization conversion element 313, a superimposed lens 314, and collimating lenses 315. The first lens array 311 has a configuration in which small lenses (first small lenses) having a substantially rectangular-shaped outline when viewed in the direction of the lighting optical axis OA are arranged in a matrix pattern. The respective small lenses split the light flux emitted from the light source unit 30 into partial light fluxes and emit the split partial light fluxes in the direction along the lighting optical axis OA. The second lens array 312 has a configuration in which small lenses (second small lenses) are arranged in a matrix pattern so as to correspond to the partial light fluxes outgoing from the small lenses of the first lens array 311. The second lens array 312 causes the partial light fluxes going out from the first lens array 311 to direct toward the superimposed lens 314, respectively.

The polarization converting element 313 has a function to align the respective partial light fluxes which correspond to random polarized light going out from the second lens array 312 into substantially one type of polarized light which can be used by a liquid crystal panel 341. The respective partial light fluxes going out from the second lens array 312 and converted into the substantially one type of the polarized light by the polarization conversion element 313 are substantially superimposed on the surface of the liquid crystal panel 341 by the superimposed lens 314. The light fluxes going out from the superimposed lens 314 are collimated by the collimating lenses 315 and are superimposed on the liquid crystal panel 341. Specifically, the collimating lenses 315 are provided for each of three color lights, described later.

The illuminating optical unit 31 includes a light-adjusting unit 10 configured to adjust a passing light amount of the light flux provided therein. Specifically, the light-adjusting unit 10 of the first embodiment includes a pair of rotating light-shielding plates 7 (see FIG. 2), and the light-shielding plates 7 are arranged so as to be positioned between the first lens array 311 and the second lens array 312.

The light-adjusting unit 10 in the first embodiment is configured to block part of the light flux emitted from the light source unit 30 (the first lens array 311) to adjust the light amount to be passed therethrough by the pair of light-shielding plates 7 rotating in a positional relationship of being substantially symmetry with respect to a horizontal plane (XY plane) passing through the lighting optical axis OA on the basis of the control by the control unit. The light flux passing through the light-shielding plates 7 enters the second lens array 312. Detailed configuration and operation of the light-adjusting unit 10 will be described later.

The color separating optical unit 32 includes a first dichroic mirror 321, a second dichroic mirror 322, and a reflecting mirror 323. The color separating optical unit 32 separates the light flux outgoing from the illuminating optical unit 31 into the three color lights of red (R) light, green (G) light, and blue (B) light.

The relay optical unit 33 includes an incident side lens 331, a relay lens 333, and reflecting mirrors 332 and 334. The relay optical unit 33 guides an R light separated by the color separating optical unit 32 to an R-light liquid crystal panel 341R. In the first embodiment, the relay optical unit 33 guides the R-light. However, the invention is not limited thereto, and a configuration in which the relay optical unit 33 guides a B light, for example, is also applicable.

The electro-optic unit 34 includes an incident side polarizing plate 342, the liquid crystal panel 341 as a light-modulating unit (341R designates the R-light liquid crystal panel, 341G designates a G-light liquid crystal panel, and 341B designates a B-light liquid crystal panel), an outgoing-side polarizing plate 343, and a cross-dichroic prism 344. The incident side polarizing plate 342 and the outgoing-side polarizing plate 343 are provided for each of the liquid crystal panels 341R, 341G, and 341B.

The liquid crystal panels 341 (341R, 341G, and 341B) modulate the light fluxes separated by light colors by the color separating optical unit 32 according to the image signal. The cross-dichroic prism 344 has a substantially square shape obtained by bonding four rectangular prisms to each other in plan view, and two dielectric multi-layer films are formed on interfaces of the bonded rectangular prisms. The cross-dichroic prism 344 combines the respective color lights modulated by the liquid crystal panels 341R, 341G, and 341B and directs the combined color light to the projecting lens 35.

The projecting lens 35 is composed of a lens unit which is a combination of a plurality of lenses, and projects the light flux modulated and combined by the electro-optic unit 34 on the projecting surface such as the screen in an enlarged scale.

Since the projector 1 is capable of adjusting the light amount of the light flux entering the electro-optic unit 34 by the light-adjusting unit 10, for example, dynamic contrast of an image to be projected may be improved by adjusting the light amount of the light flux in response to scenes.

Figure 2:
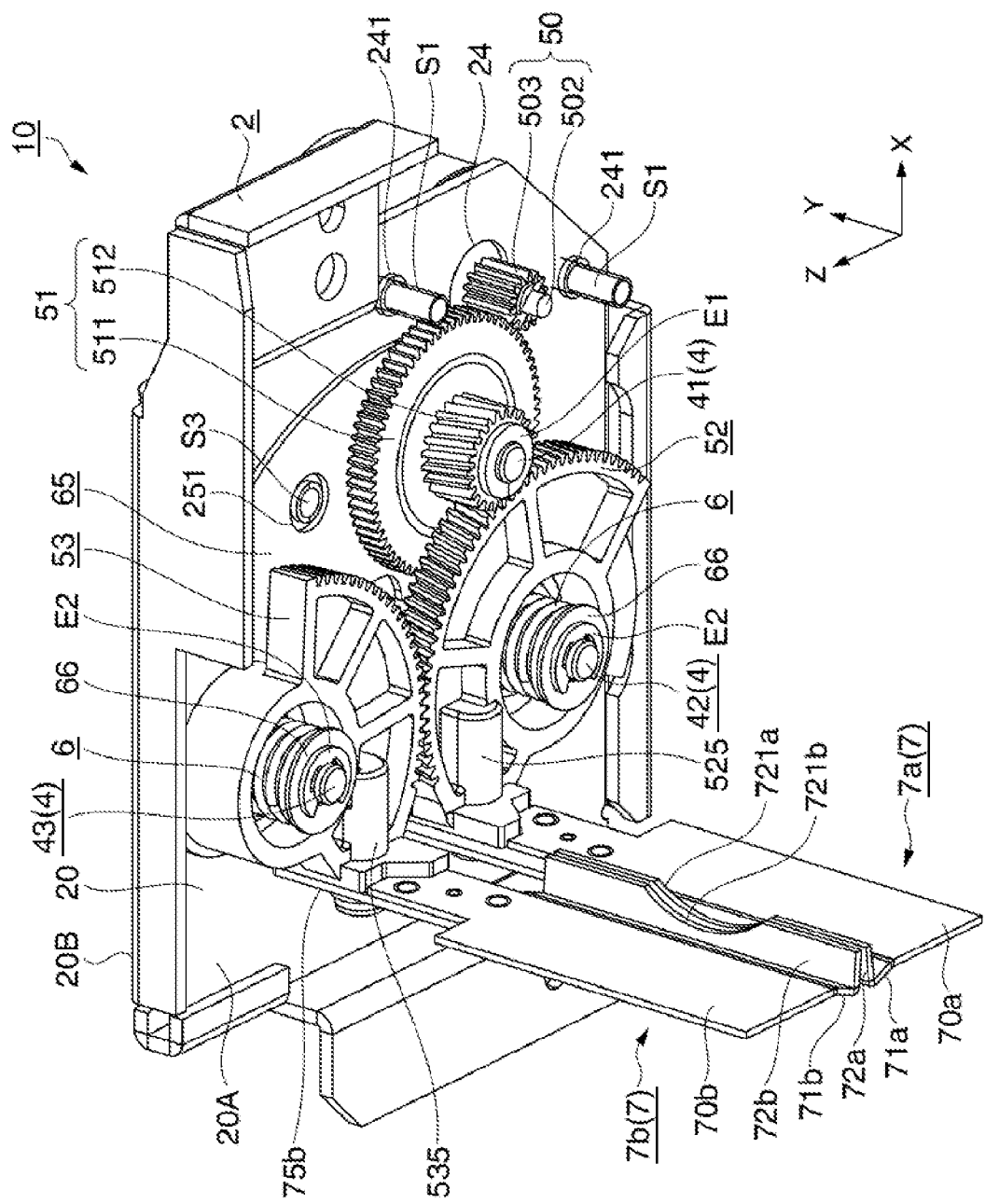
FIG. 2 is a perspective view illustrating a schematic configuration of a light-adjusting unit.
Figure 3:
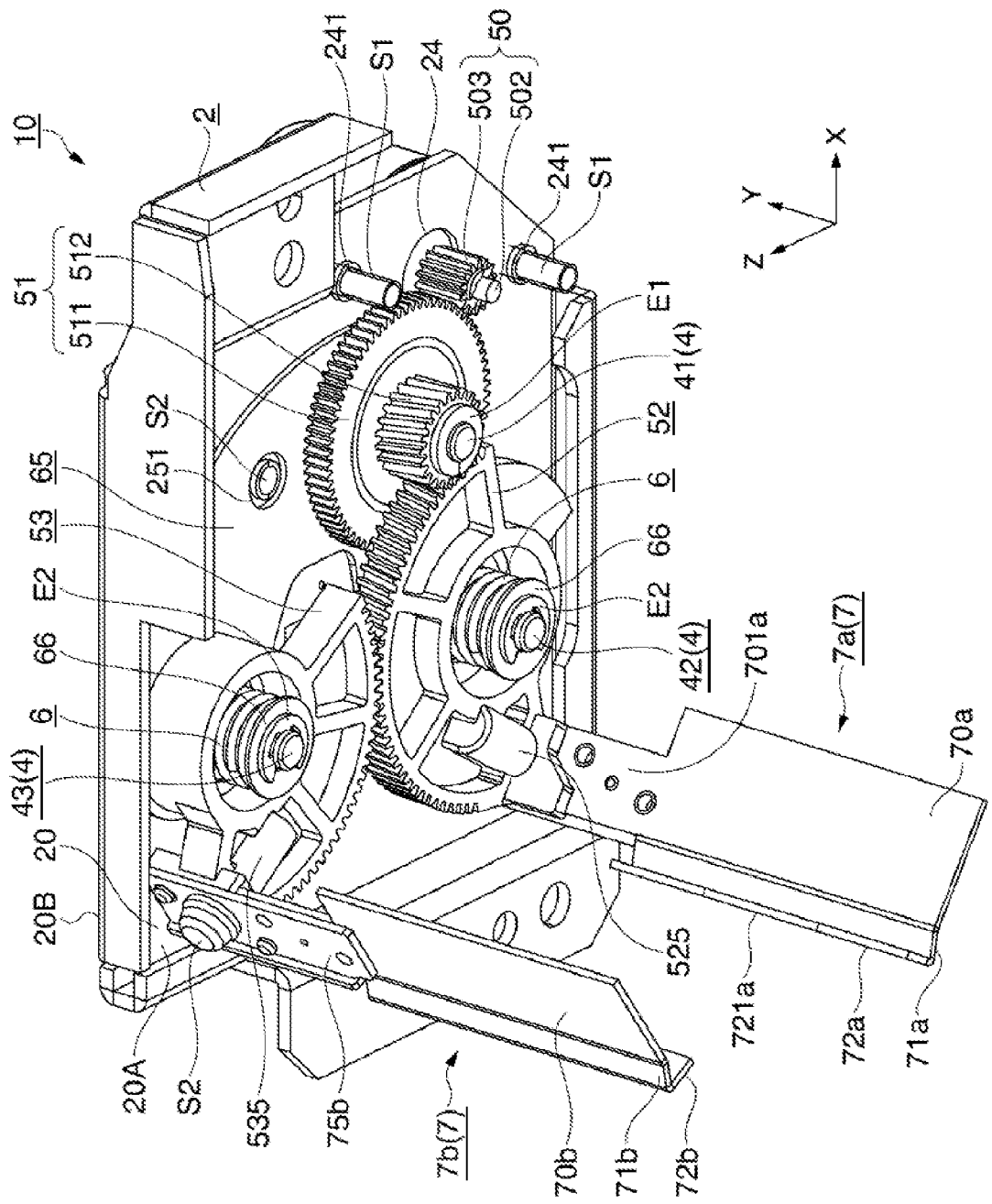
FIG. 3 is a perspective view illustrating the schematic configuration of the light-adjusting unit.
Figure 4:
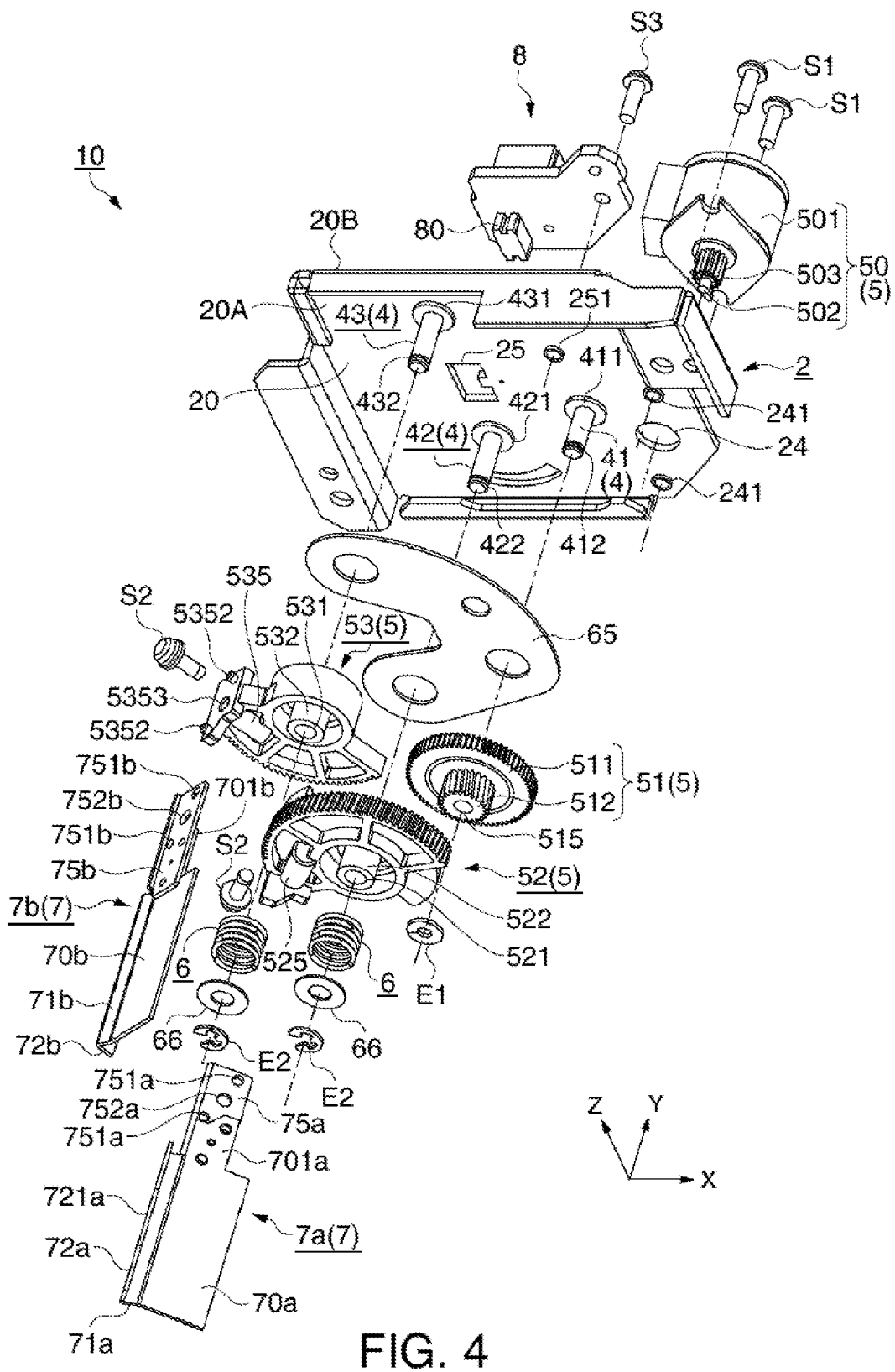
FIG. 4 is an exploded perspective view illustrating the light-adjusting unit.
Figure 5:
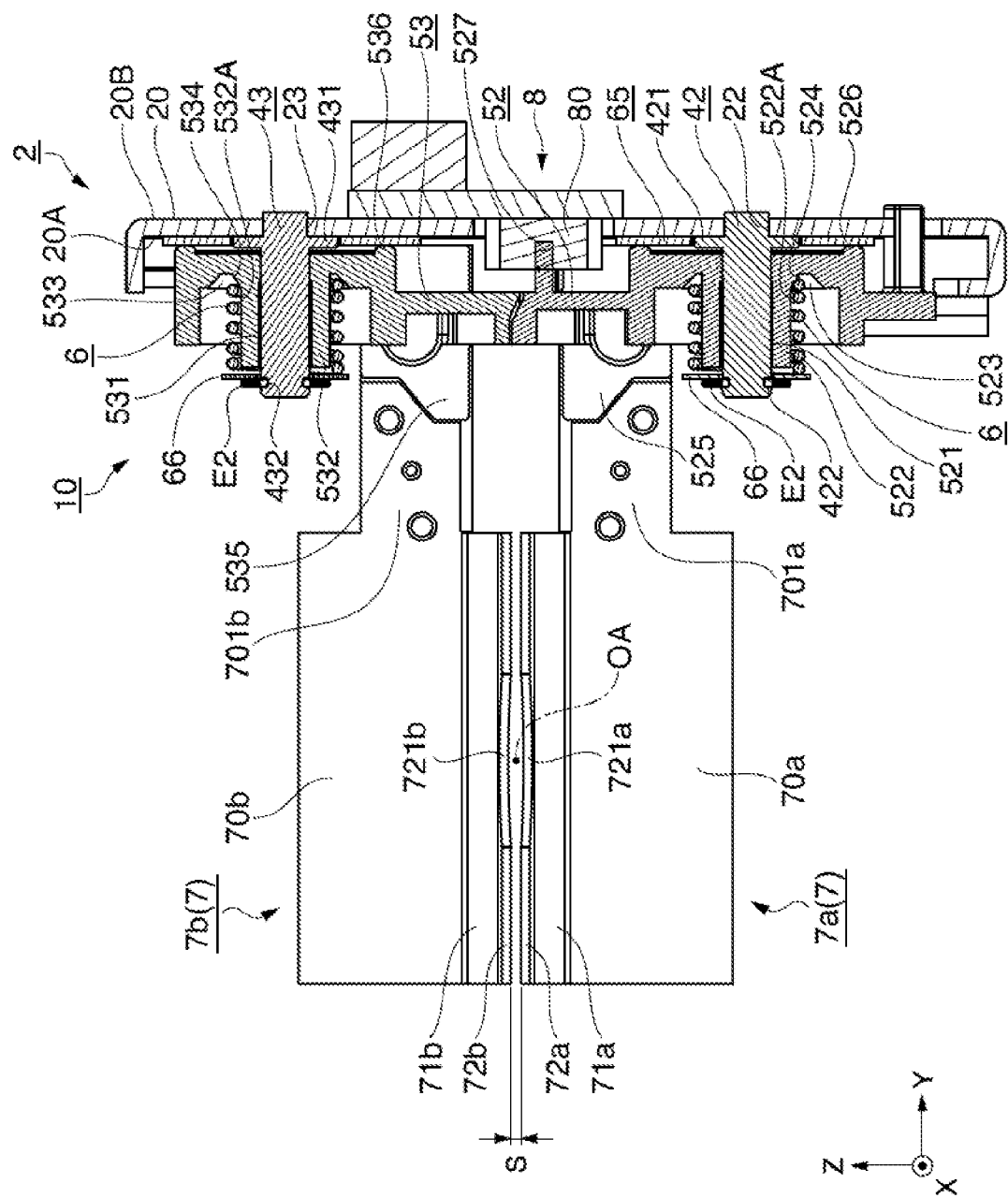
FIG. 5 is a schematic cross-sectional view illustrating the light-adjusting unit.
Figure 6:
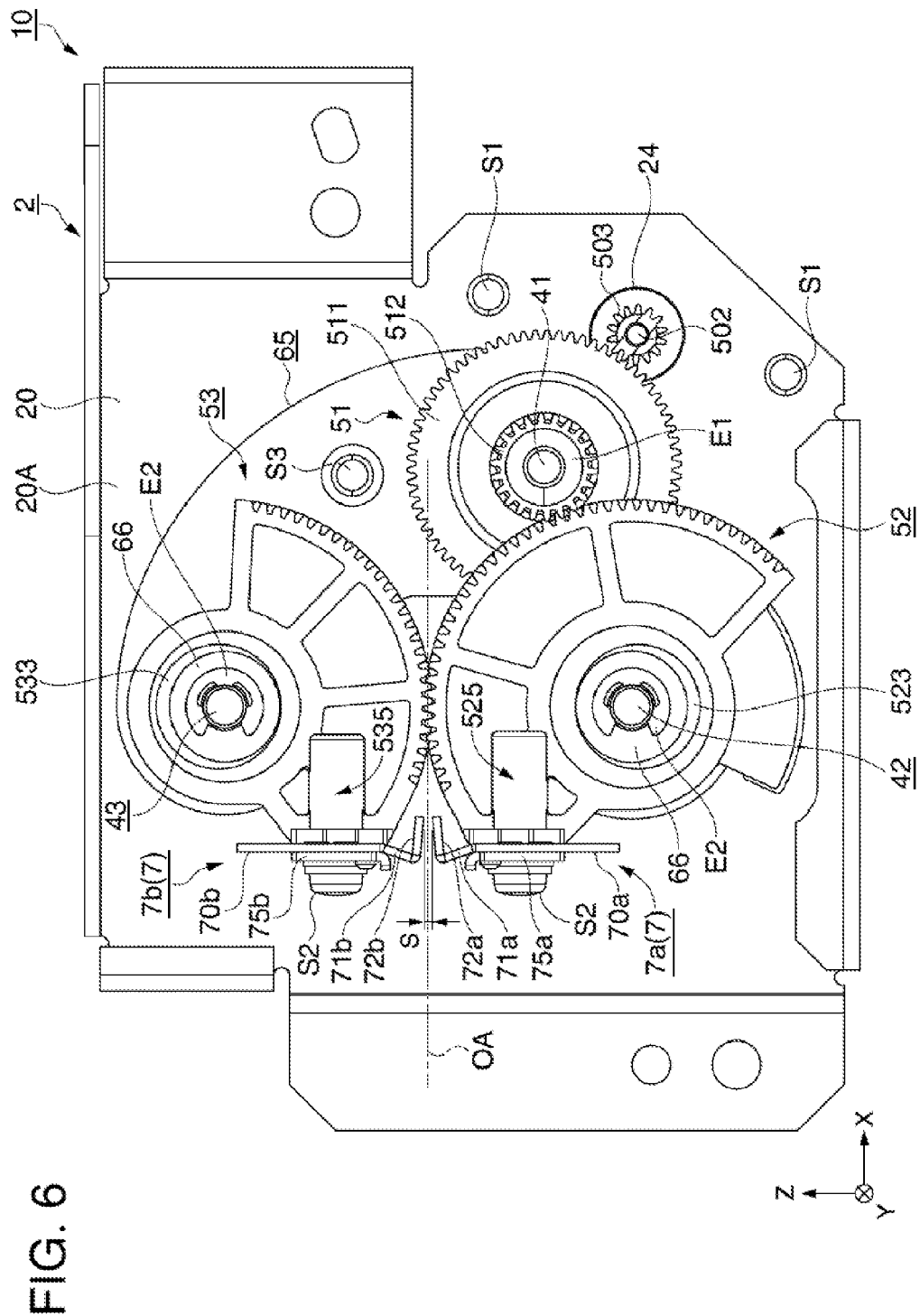
FIG. 6 is a schematic side view illustrating the light-adjusting unit.
Figure 7:
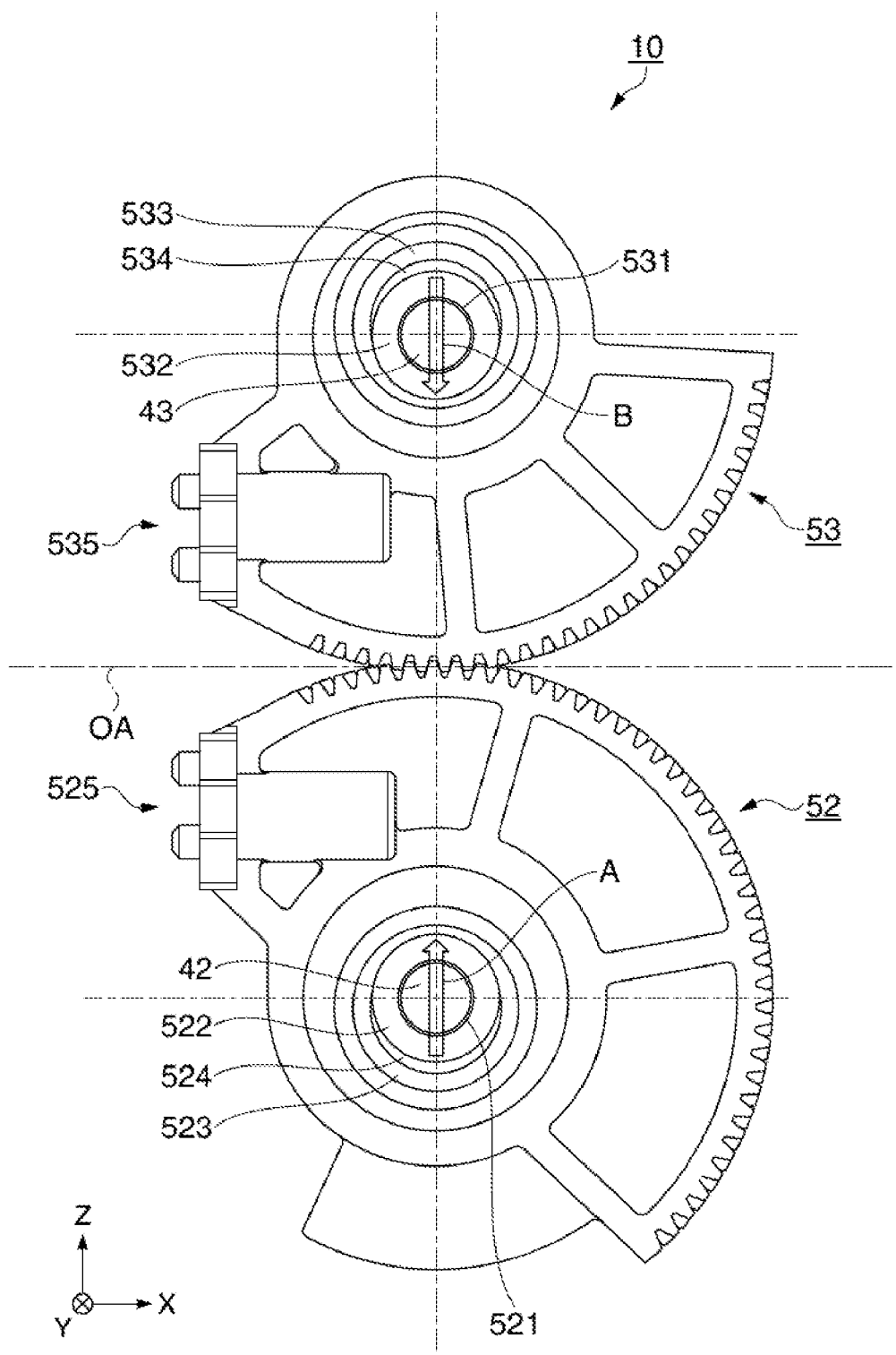
FIG. 7 is a drawing illustrating rotation transmitting gears in FIG. 6.

FIG. 2 and FIG. 3 are perspective views illustrating a schematic configuration of the light-adjusting unit 10. FIG. 2 is a perspective view illustrating a state in which the light-shielding plates 7 of the light-adjusting unit 10 are closed (fully-closed state), and FIG. 3 is a perspective view illustrating a state in which the light-shielding plates 7 of the light-adjusting unit 10 are opened (fully-opened state). FIG. 4 is an exploded perspective view illustrating the light-adjusting unit 10. FIG. 5 is a perspective cross-sectional view illustrating the light-adjusting unit 10. FIG. 2 to FIG. 5 are the drawings illustrating the light-adjusting unit 10 viewed from the light flux outgoing side (+X direction). FIG. 6 is a schematic side view illustrating the light-adjusting unit 10. FIG. 7 is a drawing illustrating rotation transmitting gears in FIG. 6. FIG. 5 to FIG. 7 are the drawings in which the light-shielding plates 7 are fully closed. Referring now to FIG. 2 to FIG. 7, the configuration and the operation of the light-adjusting unit 10 will be described.

As illustrated in FIG. 2, a state in which the light-adjusting unit 10 blocks the light flux by the pair of light-shielding plates 7 to the maximum (a state in which the passing light amount is minimized) is referred to as "fully-closed state" (the state in which the light-shielding plates 7 are closed), which is used below as needed. As illustrated in FIG. 3, a state in which the light-adjusting unit 10 blocks the light flux by the pair of light-shielding plates 7 to the minimum (a state in which the passing light amount is maximized (the state in which the light flux is not blocked in the first embodiment)) is referred to as "fully-opened state", which is used below as needed.

As illustrated in FIG. 2 to FIG. 4, the light-adjusting unit 10 substantially includes a supporting substrate 2, supporting shafts 4 provided on the supporting substrate 2, a motor 50, a first gear 51, a second gear 52 and a third gear 53 as a pair of the rotation transmitting gears, and the pair of light-shielding plates 7 (7a, 7b) held by the second gear 52 and the third gear 53. The light-adjusting unit 10 includes coil springs 6 as urging members configured to press the second gear 52 and the third gear 53 as the rotation transmitting gears against the supporting substrate 2. The coil springs 6 have a configuration of a compression coil spring. The motor 50, the first gear 51, the second gear 52, and the third gear 53 constitute a drive unit 5.

As illustrated in FIG. 2 to FIG. 4, the supporting substrate 2 includes a substrate body 20 formed into a substantially rectangular shape and three of the supporting shafts 4 mounted on the substrate body 20. Then, the supporting substrate 2 supports the first gear 51, the second gear 52, the third gear 53, and the light-shielding plates 7 on one surface 20A side of the substrate body 20, and supports the motor 50 and a sensor portion 8 on the other surface 20B side of the substrate body 20.

The substrate body 20 is formed by sheet-metal processing, and as illustrated in FIG. 2 to FIG. 4, end portions of the substrate body 20 in four directions are bent toward the one surface 20A side. The substrate body 20 includes a hole portion (not illustrated) allowing insertion of the supporting shaft 4 (a first supporting shaft 41) therethrough, and hole portions 22 and 23 (both are illustrated in FIG. 5) allowing insertion of the supporting shafts 4 (a second supporting shaft 42 and a third supporting shaft 43).

The substrate body 20 also includes a hole portion 24 allowing insertion of a spindle 502 of the motor 50 therethrough and a pair of screw holes 241 configured to fix the motor 50 in the periphery of the hole portion 24. The substrate body 20 also includes a hole portion 25 allowing insertion of a sensor 80 of the sensor portion 8 therethrough and a screw hole 251 configured to fix the sensor portion 8 formed therein. A guiding hole 26 is formed about the hole portion 22 in an arcuate shape so as to penetrate through the substrate body 20.

The light-adjusting unit 10 is fixed to a side surface of the optical component housing 36 on the +Y side (see FIG. 1). When the light-adjusting unit 10 is fixed to the optical component housing 36, the ends of the substrate body 20 in the four directions are bent toward the one surface 20A side, so that the supporting substrate 2 and the side surface of the optical component housing 36 substantially surround the second gear 52 and the third gear 53, so that dust is prevented from reaching the second gear 52 and the third gear 53. With the supporting substrate 2 fixed to the optical component housing 36, the pair of light-shielding plates 7 (7a and 7b) are arranged between the first lens array 311 and the second lens array 312.

The supporting shafts 4 includes the three supporting shafts 4 (the first supporting shaft 41, the second supporting shaft 42, and the third supporting shaft 43). The supporting shafts 4 are members configured to support the first gear 51, the second gear 52, and the third gear 53 so as to be rotatable. The second supporting shaft 42 and the third supporting shaft 43 have a configuration of a pair of the supporting shafts 4 configured to rotatably support the second gear 52 and the third gear 53. The second gear 52 and the third gear 53 correspond to the pair of rotation transmitting gears.

The second supporting shaft 42 and the third supporting shaft 43 are provided on the one surface 20A side of the substrate body 20 as illustrated in FIG. 4 and FIG. 5. Specifically, the second supporting shaft 42 and the third supporting shaft 43 are formed of metal into a column shape as illustrated in FIG. 5, and include disc-shaped flange portions 421 and 431, respectively, at one ends thereof. As illustrated in FIG. 5, the second supporting shaft 42 and the third supporting shaft 43 are provided so that the one ends are press-fitted into the hole portions 22 and 23 of the substrate body 20 until the respective flange portions 421 and 431 come into abutment with the one surface 20A side of the substrate body 20, whereby the other ends project from the one surface 20A in the −Y direction.

The second supporting shaft 42 and the third supporting shaft 43 are set to have a shaft diameter and a length so as to rotatably support the second gear 52 and the third gear 53 respectively. The lengths of the second supporting shaft 42 and the third supporting shaft 43 are set so that distal end portions thereof reach a height projecting slightly from the respective surfaces of the second gear 52 and the third gear 53 after having inserted into the second gear 52 and the third gear 53 respectively.

The first supporting shaft 41 is formed into substantially the same shape as the second supporting shaft 42. In the same manner, the first supporting shaft 41 is provided so that one of the ends is press-fitted into the hole portion (not illustrated) of the substrate body 20 until a flange portion 411 comes into abutment with the one surface 20A of the substrate body 20, whereby the other end projects from the one surface 20A in the −Y direction. A length of the first supporting shaft 41 is set so that a distal end portion thereof reaches a height projecting slightly from the surface of the first gear 51 when the first gear 51 is inserted.

In the first embodiment, a sheet member 65 is provided on the one surface 20A side of the substrate body 20 with reference to the three supporting shafts 4 provided on the substrate body 20. The sheet member 65 is formed by stamping a thin sheet-type synthetic resin member. The sheet member 65 has a high flatness in comparison with the flatness of the substrate body 20, and also has lubricity.

The sheet member 65 is a member configured to allow the first gear 51, the second gear 52, and the third gear 53 to slide thereon more smoothly than on the surface of the substrate body 20 when the first gear 51, the second gear 52, and the third gear 53 rotate. The first gear 51, the second gear 52, and the third gear 53 rotate while sliding smoothly on the surface of the sheet member 65.

The sheet member 65 is formed into a shape having a predetermined diameter about the three supporting shafts 4 by being guided by the flange portions 411, 421, and 431 of the three supporting shafts 4 (see FIG. 4). Specifically, the sheet member 65 is formed to have a diameter (predetermined diameter) which allows a sliding projection (not illustrated) formed on the first gear 51 and sliding projections 526 and 536 (see FIG. 5) formed on the second gear 52 and the third gear 53 to slide on the surface of the sheet member 65, when the first gear 51, the second gear 52, and the third gear 53 rotate respectively.

The motor 50 is a drive source which generates a drive force for rotating the first gear 51, and the rotation thereof is controlled by the control unit. The motor 50 used in the first embodiment is a stepping motor. The motor 50 includes a motor body 501 having the spindle 502 as a supporting shaft and a pinion 503 installed by being press-fitted into the spindle 502 as illustrated in FIG. 2 to FIG. 4. The motor 50 is provided on the other surface 20B of the substrate body 20 by placing the pinion 503 so as to project to the one surface 20A side from the hole portion 24 of the substrate body 20, and engaging screws S1 into the screw holes 241. The pinion 503 has a configuration of a spur gear.

The first gear 51 engages the pinion 503 and transmits the drive force generated by the motor 50 to the second gear 52. Specifically, the first gear 51 transmits decelerated rotation of the pinion 503 to the second gear 52. The first gear 51 is formed of a synthetic resin and is provided with a large gear portion 511 and a small gear portion 512 formed concentrically one on top of another as illustrated in FIG. 2 to FIG. 4. The diameter of the large gear portion 511 is set to be larger than the diameters of the pinion 503 and the small gear portion 512. The large gear portion 511 has a configuration of a spur gear and the small gear portion 512 has a configuration of a helical gear.

The first gear 51 is formed with a center hole 515 (see FIG. 4) having a center thereof at a center axis of rotation. The center hole 515 is set to have an inner diameter slightly larger than an outer diameter of the first supporting shaft 41. The first supporting shaft 41 is inserted into the center hole 515 of the first gear 51, and the large gear portion 511 engages the pinion 503 and arranged on the one surface 20A side of the substrate body 20.

After having inserted the first supporting shaft 41 into the first gear 51, a fixing ring E1 engages a groove potion 412 provided on the distal end portion of the first supporting shaft 41, whereby the first gear 51 is prevented from coming apart from the first supporting shaft 41. The first gear 51 is provided with the sliding projection (not illustrated) projecting as a rib shape about the center hole 515 on the one surface 20A side of the substrate body 20. The sliding projection slides on the surface of the sheet member 65 when the first gear 51 rotates.

The second gear 52 and the third gear 53 are gears holding the light-shielding plates 7a and 7b respectively and rotates the light-shielding plates 7a and 7b by being transmitted with the rotation of the first gear 51. Specifically, the second gear 52 engages the first gear 51 (the small gear portion 512) and the third gear 53 engages the second gear 52. Then, the second gear 52 and the third gear 53 rotates in directions opposite from each other by the drive force of the motor 50 transmitted via the first gear 51.

The configuration and the operation of the second gear 52 will be described.

The second gear 52 is formed of a synthetic resin, and includes a substantially semicircular shape in plan view as illustrated in FIG. 6 and FIG. 7, and teeth to engage the first gear 51 (the small gear portion 512) are formed on the outer periphery having the semicircular shape. The second gear 52 has a configuration of a helical gear. A range where the teeth are formed is set corresponding to a range where the light-shielding plate 7a rotates. The light-adjusting unit 10 achieves a reduction in size in comparison with a case of being formed into a circular shape by the second gear 52 formed into the semi-circular shape.

As illustrated in FIG. 4, the second gear 52 is provided with a cylindrical portion 522 having a center hole 521 having a center thereof at a center axis of rotation and being formed into a cylindrical shape. The center hole 521 is set to have an inner diameter slightly larger than an outer diameter of the second supporting shaft 42. As illustrated in FIG. 2 to FIG. 4, the second gear 52 is provided on the one surface 20A of the substrate body 20 by inserting the second supporting shaft 42 into the center hole 521, and rotates about the second supporting shaft 42.

As illustrated in FIG. 5 to FIG. 7, the second gear 52 includes a groove portion 523 formed into an inclined groove shape on the outer periphery of a base portion 522A of the cylindrical portion 522. The groove portion 523 is formed eccentrically with respect to a center axis of the center hole 521 as a hole portion.

Specifically, as illustrated in FIG. 6 and FIG. 7, the groove portion 523 is formed eccentrically so that the second gear 52 is urged toward a center axis of the third supporting shaft 43 with respect to a state in which the light-shielding plates 7 are closed (fully-closed state). In FIG. 7, the direction in which the second gear 52 is urged is schematically indicated by an arrow A.

In the groove portion 523, an inclined portion 524 formed so as to be inclined eccentrically on the outer periphery of the base portion 522A of the cylindrical portion 522 corresponds to a pressing portion. With the coil springs 6 pressing the inclined portion 524, the second gear 52 is pressed against the supporting substrate 2, and is urged in the direction of the center axis of the third supporting shaft 43.

The second gear 52 is formed with a light-shielding plate mounting portion 525, the sliding projection 526, and a sensing projection 527 as illustrated in FIG. 5.

The light-shielding plate mounting portion 525 is a portion for mounting the light-shielding plate 7a and, as illustrated in FIG. 7, is formed to have a portion projecting to an end portion of the second gear 52 on the left side (−X side). The light-shielding plate mounting portion 525 is provided with a screw hole (not illustrated) opening leftward, and the light-shielding plate 7a is mounted on the second gear 52 by a screw S2 screwed into the screw hole as illustrated in FIG. 4.

The sliding projection 526 is formed so as to project in a rib shape to the one surface 20A side of the substrate body 20 about the center hole 521 as illustrated in FIG. 5. The sliding projection 526 slides on the surface of the sheet member 65 by being pressed against the sheet member 65 by the coil spring 6 when the second gear 52 rotates.

The sensing projection 527 has a function to block light irradiated from a photo sensor as the sensor 80 provided on the sensor portion 8 as illustrated in FIG. 5. The sensing projection 527 is an arcuate-shaped projection having a center thereof at the center axis of the center hole 521, and is formed so as to project to the one surface 20A side of the substrate body 20. Then, the sensing projection 527 is configured to allow insertion into a depression of the photo sensor as illustrated in FIG. 5.

The configuration and the operation of the third gear 53 will be described.

The third gear 53 is formed of a synthetic resin, and is formed in the substantially same manner as the second gear 52 as illustrated in FIG. 6 and FIG. 7. The third gear 53 has a substantially semicircular shape in plan view, and teeth to engage the second gear 52 are formed on the outer periphery having the semi-circular shape. The third gear 53 has a configuration of a helical gear. A range where the teeth are formed is set corresponding to a range where the light-shielding plate 7b rotates.

As illustrated in FIG. 4, the third gear 53 is provided with a cylindrical portion 532 having a center hole 531 having a center thereof at a center axis of rotation and being formed into a cylindrical shape. The center hole 531 is set to have an inner diameter slightly larger than an outer diameter of the third supporting shaft 43. As illustrated in FIG. 2 to FIG. 4, the third gear 53 is provided on the one surface 20A of the substrate body 20 by inserting the third supporting shaft 43 into the center hole 531, and rotates about the third supporting shaft 43. The light-adjusting unit 10 achieves a reduction in size in comparison with a case of being formed into a circular shape by the third gear 53 formed into a semi-spherical shape.

As illustrated in FIG. 5 to FIG. 7, the third gear 53 includes a groove portion 533 formed into an inclined groove shape on the outer periphery of a base portion 532A of the cylindrical portion 532. The groove portion 533 is formed eccentrically with respect to a center axis of the center hole 531 as a hole portion.

Specifically, as illustrated in FIG. 6 and FIG. 7, the groove portion 533 is formed eccentrically so that the second gear 53 is urged toward a center axis of the second supporting shaft 42 with respect to the state in which the light-shielding plates 7 are closed (fully-closed state). In FIG. 7, the direction in which the third gear 53 is urged is schematically indicated by an arrow B.

In the groove portion 533, an inclined portion 534 formed so as to be inclined eccentrically on the outer periphery of the base portion 532A of the cylindrical portion 532 corresponds to a pressing portion. With the coil spring 6 pressing the inclined portion 534, the third gear 53 is pressed against the supporting substrate 2, and is urged in the direction of the center axis of the second supporting shaft 42.

The third gear 53 is formed with a light-shielding plate mounting portion 535 and the sliding projection 536 as illustrated in FIG. 5.

The light-shielding plate mounting portion 525 is a portion for mounting the light-shielding plate 7b and, as illustrated in FIG. 7, is formed to have a portion projecting to an end portion of the third gear 53 on the left side (−X side). The light-shielding plate mounting portion 535 is provided with a screw hole 5353 opening leftward, and the light-shielding plate 7b is mounted on the third gear 53 by the screw S2 screwed into the screw hole 5353 as illustrated in FIG. 4.

The sliding projection 536 is formed so as to project in a rib shape toward the one surface 20A side of the substrate body 20 about the center hole 531 as illustrated in FIG. 5. The sliding projection 536 slides on the surface of the sheet member 65 by being pressed against the sheet member 65 by the coil springs 6 when the third gear 53 rotates.

As described above, the groove portion 523 of the second gear 52 is formed eccentrically so that the second gear 52 is urged toward the center axis of the third supporting shaft 43 with respect to the state in which the light-shielding plates 7 are closed (fully-closed state). Then, the groove portion 533 of the third gear 53 is formed eccentrically so that the third gear 53 is urged toward the center axis of the second supporting shaft 42 with respect to the state in which the light-shielding plates 7 are closed (fully-closed state).

In other words, in the first embodiment, the groove portion 523 (the inclined portion 524) of the second gear 52 and the groove portion 533 (the inclined portion 534) of the third gear 53 are formed eccentrically so that the second gear 52 and the third gear 53 are urged in the direction in which a space between opposed end portions of the pair of light-shielding plates 7a and 7b on the lighting optical axis OA side (a space S between end portions of a second inclined portion 72a and a second inclined portion 72b described later) is decreased with reference to the state in which the light-shielding plates 7 are closed (fully-closed state) as illustrated in FIG. 5 and FIG. 6.

The light-shielding plates 7 is configured to the light-shielding plate 7a held directly by the second gear 52 and the light-shielding plate 7b held directly by the third gear 53. Then, the light-shielding plates 7 (7a and 7b) of the first embodiment are arranged so as to be substantially symmetry with respect to the lighting optical axis OA of the incident light flux (specifically, with respect to the horizontal plane (XY plane) passing through the lighting optical axis OA).

The light-shielding plates 7 (7a and 7b) change the amount of rotation in response to the driving of the motor 50 controlled by the number of steps between the fully-closed state illustrated in FIG. 2 and the fully-opened state illustrated in FIG. 3. With this rotating operation, the light-shielding plates 7 (7a, 7b) block the light flux to be entered in response to the amount of rotation and adjust the light amount to be passed therethrough. From now on, the configuration of the light-shielding plates 7 will be descried with the one light-shielding plate 7b as an example.

The light-shielding plate 7b is formed by bending a metal plate. As illustrated in FIG. 2 to FIG. 6, the light-shielding plate 7b includes a rectangular-shaped light-shielding body 70b, a first inclined portion 71b inclined from a longitudinal side end portion of the light-shielding body 70b on the lighting optical axis OA side toward the light flux incident side, and the second inclined portion 72b inclined from a longitudinal side end portion of the first inclined portion 71b on the lighting optical axis OA side toward the light flux outgoing side. More specifically, the first inclined portion 71b is provided at an end portion of the light-shielding plate 7b along the axial direction of the supporting shafts 4 and, simultaneously at an end portion of the light-shielding plate 7b on the side which moves toward and away from the one light-shielding plate 7a by the rotation of the first gear 51, and is inclined in the direction apart from the supporting shafts 4. Also, the second inclined portion 72b is provided at an end portion of the first inclined portion 71b along the axial direction of the supporting shafts 4 and is inclined in the direction toward the supporting shafts 4.

The light-shielding plate 7b is formed with an arcuate-shaped cutout potion 721b, which forms a shape surrounding the lighting optical axis OA when the light-shielding plate 7b is provided, at a center of the end portion of the second inclined portion 72b on the lighting optical axis OA side. The light-shielding plate 7b is formed with a connecting portion 701b extending at a short side end portion of the light-shielding body 70b.

The light-shielding plate 7b is provided with a connecting member 75b to be mounted on (connected to) the light-shielding plate mounting portion 535 of the third gear 53 as illustrated in FIG. 4. The connecting member 75b is formed of a rectangular-shaped metallic panel. The connecting member 75b and the light-shielding body 70b are integrated by caulking the connecting member 75b and the connecting portion 701b.

The connecting member 75b is formed with a guiding hole 751b and an insertion hole 752b. The connecting member 75b is mounted on the light-shielding plate mounting portion 535 by inserting a guiding projection 5352 formed on the light-shielding plate mounting portion 535 through the guiding hole 751b, inserting the screw S2 into the insertion hole 752b, and screwing the screw S2 into the screw hole 5353 of the light-shielding plate mounting portion 535. Accordingly, the light-shielding plate 7b is mounted on the third gear 53.

The other light-shielding plate 7a is also configured in the same manner as the light-shielding plate 7b described above. The different point between the light-shielding plate 7a and the light-shielding plate 7b is that the light-shielding plate 7a and the light-shielding plate 7b of the first embodiment are arranged substantially symmetrically with respect to the horizontal plane (XY plane) passing through the lighting optical axis OA. Therefore, the components of the light-shielding plate 7a are added with a suffix "a" instead of "b" at the end of the reference numerals in contrast to the same components of the light-shielding plate 7b. The detailed description about the configuration of the light-shielding plate 7a will be omitted.

The light-shielding plates 7 decrease the light mount of the light flux passing between the light-shielding plates 7a and 7b in the fully-closed state by reducing the gap S between the light-shielding plates 7a and 7b in the fully-closed state, and hence improve the contrast of a projected image. Also, by forming a cutout portion 721a and the cutout portion 721b on the second inclined portions 72a and 72b, the change of the dimming rate (the rate of the light amount of the light flux entering the liquid crystal panel 341 when the light amount of the light flux entering the liquid crystal panel 341 in the fully-closed state is "1") becomes gentle, so that visibility of the change in brightness of the projected image caused by the light adjustment is lowered.

Subsequently, assembly of the second gear 52 will be described.

The sheet member 65 is provided on the one surface 20A of the supporting substrate 2 by being guided by the three supporting shafts 4 as a previous step of assembly of the second gear 52 on the substrate body 20. Subsequently, the first supporting shaft 41 is inserted into the first gear 51, and is fixed by the fixing ring E1. Subsequently, the second supporting shaft 42 is inserted into the second gear 52.

As illustrated in FIG. 4 and FIG. 5, the second supporting shaft 42 is inserted into the center hole 521 of the second gear 52. At this time, the teeth (helical teeth) of the small gear portion 512 of the first gear 51 are engaged with the teeth (helical teeth) of the second gear 52. Subsequently, the coil spring 6 is inserted into the cylindrical portion 522. Subsequently, the coil spring 6 is pressed to insert a spring holding plate 66 having a disc shape and being formed with a hole having a diameter slightly larger than the outline of the second supporting shaft 42 from the distal end portion of the second supporting shaft 42. Subsequently, the fixing ring E2 is locked to a groove portion 422 provided at the distal end portion of the second supporting shaft 42, so that the second gear 52 is mounted on the second supporting shaft 42.

By the assembly of the second gear 52, one of distal end portions of the coil spring 6 comes into abutment with the groove portion 523 formed eccentrically as illustrated in FIG. 5, and presses the second gear 52 against the supporting substrate 2. The coil spring 6 presses the inclined portion 524 by coming into abutment with the inclined portion 524 of the groove portion 523. Accordingly, an inner surface of the center hole 521 facing the inclined portion 524 which is being pressed is brought into abutment with an outer surface of the second supporting shaft 42.

Subsequently, assembly of the third gear 53 will be described.

As illustrated in FIG. 4 and FIG. 5, the third gear 53 is assembled in the substantially same manner as the assembly of the second gear 52. First of all, the third supporting shaft 43 is inserted through the center hole 531 of the third gear 53. At this time, the teeth (helical teeth) of the second gear 52 are engaged with the teeth (helical teeth) of the third gear 53. Subsequently, the coil spring 6 is inserted into the cylindrical portion 532. Subsequently, the coil spring 6 is pressed to insert the spring holding plate 66 having a disc shape and being formed with a hole having a diameter slightly larger than the outline of the third supporting shaft 43 from the distal end portion of the third supporting shaft 43. Subsequently, the fixing ring E2 is locked to a groove portion 432 provided at the distal end portion of the third supporting shaft 43, so that the third gear 53 is mounted on the third supporting shaft 43.

By the assembly of the third gear 53, one of the distal end portions of the coil spring 6 comes into abutment with the groove portion 533 formed eccentrically as illustrated in FIG. 5, and presses the third gear 53 against the supporting substrate 2. The coil spring 6 presses the inclined portion 534 by coming into abutment with the inclined portion 534 of the groove portion 533. Accordingly, an inner surface of the center hole 531 facing the inclined portion 534 being pressed is brought into abutment with an outer surface of the third supporting shaft 43.

When assembling the second gear 52 and the third gear 53, the light-shielding plates 7a and 7b held thereby respectively are positioned in the full-closed state as illustrated in FIG. 6. As described above, the groove portion 523 of the second gear 52 and the groove portion 533 of the third gear 53 are formed eccentrically so that the second gear 52 and the third gear 53 are urged in the direction in which the space S between the end portions of the second inclined portion 72a and the second inclined portion 72b of the pair of light-shielding plates 7a and 7b facing each other on the lighting optical axis OA side is decreased with reference to a state in which the light-shielding plates 7 are in the fully-closed state.

Accordingly, the center distance between the second gear 52 and the third gear 53 is stabilized in the fully-closed state of the light-shielding plates 7. Therefore, even though the second gear 52 and the third gear 53 rotate and the angle of rotation (the amount of rotation) of the light-shielding plates 7a and 7b changes, and repeat the fully-closed state, the fully-opened state, and an intermediate state thereof, the gap S between the end portions of the second inclined portion 72a and the second inclined portion 72b is secured when the fully-closed state is restored again.

According to the embodiment described above, the following effects are achieved.

According to the light-adjusting unit 10 of the first embodiment, the coil springs 6 press and urge the second gear 52 and the third gear 53 holding the light-shielding plates 7 (7a and 7b) against the supporting substrate 2. Accordingly, the light-adjusting unit 10 is capable of preventing rattling of rotations of the second gear 52 and the third gear 53 rotating by being supported by the second supporting shaft 42 and the third supporting shaft 43, and preventing rattling stably for the long time of use as well. Therefore, the pair of light-shielding plates 7 (7a and 7b) rotating by being directly held by the second gear 52 and the third gear 53 are allowed to maintain the stable rotation for a long time, and to adjust a passing light amount adequately.

According to the light-adjusting unit 10 of the first embodiment, with the urging members formed of the coil springs 6, the urging members may follow the rattling generated due to vibrations or the like caused by the rotations of the second gear 52 and the third gear 53, so that the second gear 52 and the third gear 53 may be stably pressed against the supporting substrate 2.

According to the light-adjusting unit 10 of the first embodiment, the coil springs 6 are capable of moving the second gear 52 and the third gear 53 by pressing the inclined portions 524 and 534 as the pressing portions provided eccentrically with respect to the center axes of the center holes 521 and 531 formed on the second gear 52 and the third gear 53 and bringing the inner surfaces of the center holes 521 and 531 into abutment with the outer surfaces of the second supporting shaft 42 and the third supporting shaft 43. Accordingly, the light-adjusting unit 10 may prevent the inclination of the second gear 52 and the third gear 53 with respect to the second supporting shaft 42 and the third supporting shaft 43 because the gaps of the second supporting shaft 42 and the third supporting shaft 43 with respect to the center hole 521 and the center hole 531 may be eliminated. Therefore, the light-adjusting unit 10 may prevent the rattling of the rotations of the second gear 52 and the third gear 53 further reliably.

According to the light-adjusting unit 10 of the first embodiment, in the state in which the light-shielding plates 7 (7a and 7b) are closed, the second gear 52 and the third gear 53 are urged in the direction in which the gap S between the end portions of the pair of light-shielding plates 7 facing each other on the lighting optical axis OA side is reduced, so that the center distance between the second gear 52 and the third gear 53 in the state in which the light-shielding plates 7 are closed may be stabilized. Accordingly, by setting the gap S between the end portions of the light-shielding plates 7 facing each other on the lighting optical axis OA side is minimized in the state in which the light-shielding plates 7 are closed, the light-adjusting unit 10 may maintain a state in which the gap S in the state in which the light-shielding plates 7 are closed is minimized even though the light-shielding plates 7 are rotated for a long time. Therefore, the light-adjusting unit 10 is capable of performing the light-adjusting control of the light-shielding plates 7 with high degree of accuracy.

According to the light-adjusting unit 10 of the first embodiment, the sheet-shaped sheet member 65 having lubricity is provided between the second gear 52 and the third gear 53 and the supporting substrate 2. Then, the second gear 52 and the third gear 53 are urged by the coil springs 6 and are capable of sliding smoothly on the surface of the sheet member 65. Accordingly, the light-adjusting unit 10 is capable of inhibiting a noise caused by the rotations of the second gear 52 and the third gear 53 in comparison with the case where the second gear 52 and the third gear 53 slide directly on the surface of the supporting substrate 2, so that the silencing of the light-adjusting unit 10 is achieved.

According to the light-adjusting unit 10 of the first embodiment, since the second gear 52 and the third gear 53 slide smoothly on the surface of the sheet member 65, the wearing of the second gear 52 and the third gear 53 by the sliding motion is reduced in comparison with the case where the second gear 52 and the third gear 53 slide directly on the surface of the supporting substrate 2. Accordingly, the light-adjusting unit 10 is capable of reducing generation of dust due to the wearing.

According to the projector 1 of the first embodiment, since the light-adjusting control of the light amount to be passed is achieved with high degree of accuracy with the provision of the light-adjusting unit 10 configured to prevent the rattling of the rotations of the second gear 52 and the third gear 53, high dynamic contrast with respect to the image to be projected is achieved and, in addition, the high dynamic contrast may be maintained for a long time.

Second Embodiment

Figure 8:
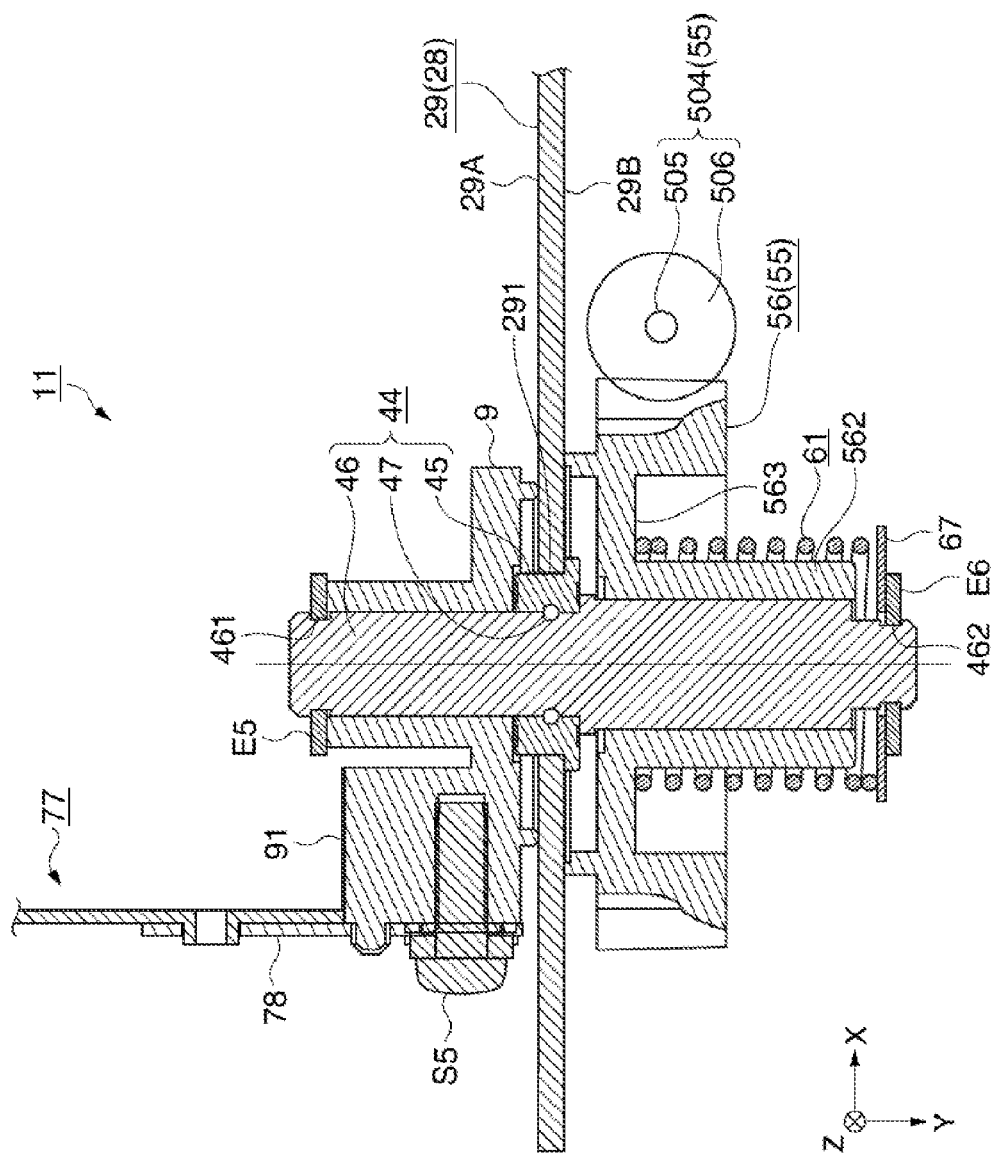
FIG. 8 is a schematic cross-sectional view illustrating a light-adjusting unit according to a second embodiment.

FIG. 8 is a schematic cross-sectional view of a light-adjusting unit 11 according to a second embodiment. In FIG. 8, the light-adjusting unit 11 illustrates a configuration for rotating one of light-shielding plates 77. Referring to FIG. 8, outlines of the configuration and the operation of the light-adjusting unit 11 will be described.

The light-adjusting unit 11 in the projector 1 of the second embodiment, the arrangement including the rotation transmitting gear is different from the light-adjusting unit 10 of the first embodiment. The components other than the light-adjusting unit 11 such as the optical unit 3 are the same as those of the first embodiment.

The light-adjusting unit 11 of the second embodiment roughly includes a supporting substrate 28, a pair of supporting shafts 44 to be provided on the supporting substrate 28, a motor 504, a pair of rotation transmitting gears 56, a pair of rotation transmitting members 9, the pair of light-shielding plates 77 held by the rotation transmitting members 9, and a pair of coil springs 61 as the urging member configured to press the rotation transmitting gears 56 against the supporting substrate 28. A drive unit 55 includes the motor 504 and the rotation transmitting gears 56.

The supporting substrate 28 has a substrate body 29 formed into a substantially rectangular shape. A hole portion 291 which allows insertion of the supporting shafts 44 is formed on the substrate body 29. One (−Y side) of the surfaces of the supporting substrate 28 is referred to as one surface 29A and the other (+Y side) surface thereof is referred to as the other surface 29B.

The supporting substrate 28 in the second embodiment includes the rotation transmitting members 9 and the light-shielding plates 77 on the one surface 29A side, and the motor 504, the rotation transmitting gears 56, and the coil springs 61 on the other surface 29B side. The light flux emitted from the light source unit 30 enters the light-shielding plates 77 on the one surface 29A side of the supporting substrate 28 from the −X direction. Then, the entered light flux is blocked by the light-shielding plates 77, and part of the light flux which is not blocked passes in the +X direction. In the second embodiment, the rotation transmitting gears 56 do not hold the light-shielding plates 77 directly, but hold the same indirectly to allow the rotation of the light-shielding plates 77.

The supporting shafts 44 each include a cylindrical sleeve 45, and a column-shaped shaft 46 held inside the sleeve 45 and extending on both sides of the sleeve 45. The sleeve 45 and the shaft 46 are configured to be capable of rotating with respect to each other via a bearing 47. The bearing 47 includes a row of ball bearings. Each of the supporting shafts 44 is fixed to the supporting substrate 28 by press-fitting the sleeve 45 into the hole portion 291 of the substrate body 29.

The shaft 46 extending from the supporting substrate 28 on the other surface 29B side is inserted into and rotatably supports the rotation transmitting gear 56. The rotation transmitting gears 56 have a configuration of a helical gear, and engage a warm 506 press-fitted to a spindle 505 of the motor 504. The coil spring 61 is inserted into a cylindrical portion 562 of the rotation transmitting gear 56. One end of the coil spring 61 comes into abutment with a groove portion bottom surface 563. After having inserted the coil spring 61 into the cylindrical portion 562, a spring holding plate 67 configured to hold the coil spring 61 is fitted on the shaft 46, so that a fixing ring E6 is locked to a groove portion 462. Accordingly, on the shaft 46, the rotation transmitting gear 56 is fixed between the supporting substrate 28 and the spring holding plate 67.

The rotation transfer member 9 is fitted on the shaft 46 extending from the supporting substrate 28 on the one surface 29A side and rotatably held thereby. On the shaft 46, the rotation transmitting member 9 is fixed between the supporting substrate 28 and a fixing ring E5 by locking the fixing ring E5 to a groove portion 461.

The rotation transmitting member 9 has a light-shielding plate mounting portion 91 configured to fix the light-shielding plates 77. The light-shielding plates 77 of the second embodiment are configured in the same manner as the light-shielding plates 7 of the first embodiment. The light-shielding plates 77 are integrated with a connecting member 78 by a caulking process, and are mounted on the light-shielding plate mounting portion 91 by a screw S5.

In the light-adjusting unit 11 configured in this manner, the groove portion bottom surface 563 of the rotation transmitting gears 56 and the spring holding plate 67 are urged by the coil spring 61. Accordingly, the rotation transmitting gear 56 is pressed against the supporting substrate 28. The spring holding plate 67 is pressed toward the side opposite from the other surface 29B side (+Y direction) of the supporting substrate 28. Accordingly, the shaft 46 is pressed in the +Y direction, and is moved in the +Y direction by an amount corresponding to a gap of the bearing 47 in the Y-axis direction. By the movement of the shaft 46 toward the +Y direction, the rotation transmitting member 9 moves in the +Y direction, and is pressed against the one surface 29A of the supporting substrate 28.

With the light-adjusting unit 11 configured in this manner, when the warm 506 of the motor 504 rotates, the rotation transmitting gears 56 engaging the warm 506 rotate. With the rotation of the rotation transmitting gears 56, the shaft 46 rotates with respect to the sleeve 45 by the bearing 47. By the rotation of the shaft 46, the rotation transmitting members 9 rotate. By the rotation of the rotation transmitting members 9, the light-shielding plates 77 connected thereto rotate.

According to the second embodiment described above, the following effects are achieved.

According to the light-adjusting unit 11 of the second embodiment, the coil springs 61 press and urge the rotation transmitting gears 56 indirectly holding the light-shielding plates 77 against the supporting substrate 28. Accordingly, the light-adjusting unit 11 is capable of preventing rattling of rotations of the rotation transmitting gears 56 rotating by being supported by the supporting shafts 44, and preventing rattling stably for the long time of use as well. Therefore, the pair of light-shielding plates 77 rotating by being indirectly held by the rotation transmitting gears 56 are allowed to maintain the stable rotation for a long time, and to adjust a passing light amount adequately.

The embodiments described above may be implemented by applying various modifications or improvements without departing the scope of the invention. Modifications will be described below.

According to the light-adjusting unit 10 of the first embodiment, the inclined portions 524 and 534 as the pressing portions provided eccentrically with respect to the center axes of the center holes 521 and 531 formed on the second gear 52 and the third gear 53 are pressed by the coil springs 6. However, a configuration in which surface portions which are not eccentric are provided on the second gear 52 and the third gear 53 and the coil springs press only these surface portions is also applicable. In this case, the second gear 52 and the third gear 53 are pressed against the supporting substrate, whereby the rattling of the rotations of the second gear 52 and the third gear 53 may be prevented.

The light-adjusting units 10 and 11 of the first and second embodiments employ the coil springs 6 and 61 as the urging members. However, the urging members are not limited to the coil springs 6 and 61, and leaf springs or the like may be employed.

The light-adjusting unit 10 of the first embodiment employs the inclined portions 524 and 534 as the pressing portions. However, the pressing portions are not limited to the inclined portions 524 and 534, and only have to have a shape or a configuration being provided eccentrically with respect to the center axes of the center holes 521 and 531, be capable of bringing the inner surfaces of the center holes 521 and 531 against the outer surfaces of the second supporting shaft 42 and the third supporting shaft 43, and be capable of eliminating the gaps of the second supporting shaft 42 and the third supporting shaft 43 with respect to the center holes 521 and 531.

The light-adjusting unit 10 of the first embodiment includes the light-shielding plate bodies 70a and 70b, the first inclined portions 71a and 71b, and the second inclined portions 72a and 72b in the light-shielding plates 7 (7a, 7b), and the second inclined portions 72a and 72b include the cutout portions 721a and 721b. However, the shapes of the first inclined portions 71a and 71b, the second inclined portions 72a and 72b, and the cutout portions 721a and 721b may be changed as needed. This applies to the second embodiment as well.

The light-shielding plates 7 (7a and 7b) of the first embodiment are arranged so as to be substantially symmetry with respect to the horizontal plane (XY plane) passing through the lighting optical axis OA. However, the light-shielding plates do not have to be arranged symmetrically. This applies to the second embodiment as well.

The light-adjusting unit 10 of the first embodiment includes the light-shielding plates 7 configured to open and close in the Z-direction. However, the mechanism opening and closing in the Y-direction is also applicable. This applies to the second embodiment as well.

The light sources 301 of the first and second embodiments employ an extra high-pressure mercury lamp. However, the invention is not limited thereto, and various types of electrical discharge lamps emitting at high brightness may be employed and, for example, a metal halide lamp or a high-pressure mercury lamp or the like may be employed.

The optical units 3 of the first and second embodiments employ so-called a three-panel system using three light-modulating units (liquid-crystal panels 341) corresponding to the red light, the green light, and the blue light. However, the invention is not limited thereto, and a light-modulating unit of a single plate system may be employed. It is also possible to additionally employ the light-modulating unit for improving the contrast.

The optical units 3 of the first and second embodiments employ a transmitting-type light-modulating unit (transmission liquid crystal panel 341). However, the invention is not limited thereto, and a reflection light-modulating unit may also be employed.

The entire disclosure of Japanese Patent Application No. 2012-023835, filed Feb. 7, 2012 is expressly incorporated by reference herein.

What is claimed is:

1. A light-adjusting unit comprising:
a pair of light-shielding plates arranged about an optical axis of an incoming light flux and configured to block the light flux in response to the amount of rotation;
a pair of rotation transmitting gears configured to hold and rotate the pair of light-shielding plates respectively;
a pair of supporting shafts configured to rotatably support the pair of rotation transmitting gears respectively;
a supporting substrate on which the pair of supporting shafts are provided; and
a pair of urging members configured to press and urge the pair of rotation transmitting gears respectively against the supporting substrate,
wherein each of the pair of rotation transmitting gears includes a hole portion configured to guide the corresponding supporting shaft of the pair of supporting shafts, and a groove portion formed eccentrically with respect to a center of the hole portion and configured to be pressed by the urging member.

2. The light-adjusting unit according to claim 1, wherein the pair of urging members have a configuration of a coil spring.

3. A projector comprising:
the light-adjusting unit according to claim 2;
a light source unit configured to emit the light flux; and
a light-modulating unit configured to modulate the light flux adjusted by the light-adjusting unit in response to an image signal.

4. The projector according to claim 3, comprising
a first lens array having a plurality of first small lenses configured to split the light flux emitted from the light-source unit into partial light fluxes; and
a second lens array having second small lenses corresponding to the first small lenses, wherein
the pair of light-shielding plates are arranged between the first lens array and the second lens array.

5. The light-adjusting unit according to claim 1, wherein the pair of rotation transmitting gears each include a pressing portion inclined with respect to an axial direction of the corresponding supporting shaft and configured to be pressed by the corresponding urging member of the pair of urging members.

6. The light-adjusting unit according to claim 5, wherein the pressing portion is provided in the groove portion in a direction opposite from a direction in which is substantially perpendicular to the axial direction of the corresponding supporting shaft and in which the corresponding rotation transmitting gear of the pair of rotating transmitting gears is urged by the corresponding urging member.

7. A projector comprising:
the light-adjusting unit according to claim 6;
a light source unit configured to emit the light flux; and
a light-modulating unit configured to modulate the light flux adjusted by the light-adjusting unit in response to an image signal.

8. The light-adjusting unit according to claim 5, wherein the pressing portion is provided eccentrically with respect to the center of the hole portion so that the pair of rotation transmitting gears are respectively urged by the corresponding urging member in directions to reduce a space between the pair of light-shielding plates.

9. A projector comprising:
the light-adjusting unit according to claim 8;
a light source unit configured to emit the light flux; and
a light-modulating unit configured to modulate the light flux adjusted by the light-adjusting unit in response to an image signal.

10. A projector comprising:
the light-adjusting unit according to claim 5;
a light source unit configured to emit the light flux; and
a light-modulating unit configured to modulate the light flux adjusted by the light-adjusting unit in response to an image signal.

11. The light-adjusting unit according to claim 1, wherein a sheet member has lubricity and is provided between the pair of rotation transmitting gears and the supporting substrate.

12. A projector comprising:
the light-adjusting unit according to claim 11;
a light source unit configured to emit the light flux; and
a light-modulating unit configured to modulate the light flux adjusted by the light-adjusting unit in response to an image signal.

13. The light-adjusting unit according to claim 1, wherein the pair of light-shielding plates each include
a first inclined portion provided at an end portion thereof which moves toward and away by the rotation of the corresponding rotation transmitting gear, the first inclined portion extending along the axial direction of the corresponding supporting shaft and inclined in a direction away from the corresponding supporting shaft; and
a second inclined portion provided at an end portion of the first inclined portion, the second inclined portion extending along the axial direction of the corresponding supporting shaft and inclined in a direction toward the corresponding supporting shaft.

14. The light-adjusting unit according to claim 13, wherein the second inclined portion includes a cutout portion having a shape surrounding an area where the optical axis of the light flux is positioned when the light amount blocked by the pair of light-shielding plates is maximum.

15. A projector comprising:
the light-adjusting unit according to claim 14;
a light source unit configured to emit the light flux; and a light-modulating unit configured to modulate the light flux adjusted by the light-adjusting unit in response to an image signal.

16. A projector comprising:

the light-adjusting unit according to claim 13;

a light source unit configured to emit the light flux; and a light-modulating unit configured to modulate the light flux adjusted by the light-adjusting unit in response to an image signal.

17. A projector comprising:

the light-adjusting unit according to claim 1;

a light source unit configured to emit the light flux; and a light-modulating unit configured to modulate the light flux adjusted by the light-adjusting unit in response to an image signal.

18. The projector according to claim 17, comprising a first lens array having a plurality of first small lenses configured to split the light flux emitted from the light-source unit into partial light fluxes; and a second lens array having second small lenses corresponding to the first small lenses, wherein the pair of light-shielding plates are arranged between the first lens array and the second lens array.

* * * * *